United States Patent [19]

St. Pierre et al.

[11] Patent Number: 4,521,222

[45] Date of Patent: Jun. 4, 1985

[54] RESIN-BONDED GRINDING ELEMENTS WITH DUAL COATED DIAMOND GRIT FOR DRY GRINDING AND WET GRINDING CEMENTED CARBIDE WORKPIECES

[75] Inventors: Philippe D. St. Pierre, Worthington; Michael T. Buckner, Columbus, both of Ohio

[73] Assignee: General Electric Company, Worthington, Ohio

[21] Appl. No.: 429,938

[22] Filed: Sep. 30, 1982

[51] Int. Cl.³ .............................................. B24D 11/00
[52] U.S. Cl. ........................................ 51/295; 51/309
[58] Field of Search .................................. 51/295, 309

[56] References Cited

U.S. PATENT DOCUMENTS

| | | | |
|---|---|---|---|
| 2,411,867 | 12/1946 | Brenner | 51/309 |
| 3,528,788 | 9/1970 | Seal | 51/295 |
| 3,779,727 | 12/1973 | Sioui et al. | 51/298 |
| 3,904,391 | 9/1975 | Lindstrom et al. | 51/295 |
| 3,923,476 | 12/1975 | Roy et al. | 51/295 |
| 3,929,432 | 12/1975 | Caveney | 51/295 |
| 3,957,461 | 5/1976 | Lindstrom et al. | 51/295 |
| 3,984,214 | 10/1976 | Pratt et al. | 51/295 |
| 4,239,502 | 1/1980 | Slack et al. | 51/295 |
| 4,246,006 | 1/1981 | Phaal | 51/309 |
| 4,278,448 | 7/1981 | Ishizuka et al. | 51/295 |

FOREIGN PATENT DOCUMENTS 49867 of 1972 Japan .
26548 of 1981 Japan .
70/3466 5/1971 South Africa .
1344237 of 1974 United Kingdom .

OTHER PUBLICATIONS

Sioui, R. H., "The Use of Silver in Diamond and CBN Wheels for Dry Grinding Hard Materials", *Cutting Tool Engineering*, Jul./Aug. 1980.

*Primary Examiner*—Paul Lieberman
*Assistant Examiner*—Willie Thompson
*Attorney, Agent, or Firm*—Robert R. Schroeder

[57] ABSTRACT

Disclosed is an improvement in method for both dry grinding and wet grinding a workpiece selected from cemented tungsten carbide and combinations of cemented tungsten carbide and steel with a single resin bonded grinding element having metal-coated diamond particles embedded in the grinding surface thereof. Such improved method comprises providing coated diamond particles useful for both dry grinding and wet grinding operations which comprises diamond coated particles coated with two layers of metal, the inner layer consisting of between about 40% and 130% by weight of said diamond particle of nickel and the outer layer consisting of between about 20% and 70% by weight of said diamond particle of silver, wherein the total weight of both said silver and nickel coatings does not exceed above about 200% by weight of the uncoated diamond particle.

17 Claims, No Drawings

RESIN-BONDED GRINDING ELEMENTS WITH DUAL COATED DIAMOND GRIT FOR DRY GRINDING AND WET GRINDING CEMENTED CARBIDE WORKPIECES

BACKGROUND OF THE INVENTION

The present invention relates to resin-bonded grinding elements containing diamond grit and more particularly to the use of dual-coated diamond grit therein for both dry grinding and wet grinding cemented carbide workpieces.

Use of metal coated diamond grit embedded in the abrasive section of resin bonded grinding wheels is a well practiced commercial technique for enhancing the grinding operation. Lindstrom (U.S. Pat. No. 3,957,461) proposes such metal coated diamond for use in the grinding section of a resin bonded grinding element wherein the metal coating is taught to form a mechanically strong shell for holding together fractional portions of the diamond particles and for effectively increasing the adhesion between the diamond particles and the resin material. Coatings shown include cobalt, nickel, silver, cadmium, zinc, copper, iron, tin, molybdenum, titanium, manganese, aluminum, chromium, gold, tungsten, zirconium, and platinum group metals. Otopkov (British Pat. No. 1,344,237) proposes to coat diamond or boron nitride abrasive grains with two materials, one of which is silicon and the other of which is a metal selected from copper, silver, gold, aluminum, cobalt, nickel, ruthenium, osmium, iridium, platinum, and certain transition metals. German Auslegeschrift No. 2,218,932 apparently is an equivalent of Otopkov's British Patent. Seal (U.S. Pat. No. 3,528,788) etches the metal coating on the diamond grit for improving the grinding ratio of resin bonded grinding wheels containing the etched grit.

Sioui (U.S. Pat. No. 3,779,727) proposes to incorporate fillers into the resinous material used to formulate resin bonded abrasive tools wherein the fillers include a solid lubricant and a metal which is silver, silver coated copper, or copper powder. The diamond grit or cubic boron nitride (CBN) abrasive further may be coated with conventional metals. As noted by Sioui in "The Evolution of Tests for Diamond Wheel Performance in Dry Tool and Cutter Sharpening," Proceedings: Diamonds in the 80's, pp 131-138, Industrial Diamond Association, Chicago, Ill. (October 13-15, 1980), and in "The Use of Silver in Diamond and CBN Wheels for Dry Grinding Hard Materials", *Cutting Tool Engineering*, July/August, 1980, pp 8-11; the silver filler in the resin apparently acts as a thermal conductivity agent to remove heat fron the grinding section and workpiece area contacted by the grinding section due to the high thermal conductivity of the conductive metals silver, copper, and silver-coated copper.

Lindstrom (U.S. Pat. No. 3,955,324) proposes agglomerates of metal-coated diamonds for embedding in the grinding section of resin bonded grinding elements wherein the matrix metal of the agglomerates is a metal which possesses good heat conducting ability. Such metals are shown to include nickel, copper, cobalt, and silver or alloys thereof. Naidich (U.S. Pat. No. 4,024,675) proposes such aggregate abrasive grains wherein adhesion agents are added to the metal and abrasive grains to make a porous cake which is sintered and subsequently ground to produce the aggregated abrasive grains. Phaal (U.S. Pat. No. 4,246,006) forms aggregates of diamond particles wherein a powdered metal and the diamond abrasive particles are heated to sinter the metal followed by cooling and crushing of the resulting mass. Suitable metals for producing such agglomerates include copper, silver, tin, nickel, cobalt, and iron or alloys thereof.

Slack (U.S. Pat. No. 4,239,502) dips diamond or CBN in a molten Ag/Mn/Zr brazing alloy which coated particles are brazed onto Mo or W rim portions of grinding wheels. U.S. Pat. No. 2,411,867 mentions silver coated boart.

Finally, commonly-assigned application Ser. No. 264,765, filed May 18, 1981, now abandoned, teaches that dry grinding of cemented metal carbide workpieces and combinations of cemented metal carbide and steel workpieces can be subjected to dry-grinding with decreased power required to rotate the grinding element and increased grinding ratios by using a resin bonded grinding element having coated diamond particles embedded in the grinding surface wherein the diamond particles are coated with a layer of metal consisting essentially of silver. However, when the silver-coated diamond grit is used in wet grinding operations, it does not work as well.

Despite the advance in technology relating to use of metal coated diamond grit in grinding operations, prior metal coated diamond grit is restricted to use in either dry grinding or wet grinding operations depending upon the particular metal used to coat the diamond grit. That is, nickel-coated diamond grit typically is recommended for use in wet grinding cemented carbide workpieces while copper-coated diamond grit is recommended in dry grinding operations. Silver-coated diamond grit, as stated above, has been shown to be superior in dry grinding operations, yet of little value in wet-grinding operations. The present invention is directed to a new universal coating and universally-coated diamond grit for both dry grinding and wet grinding operations.

BROAD STATEMENT OF THE INVENTION

The present invention is an improvement in a method for providing a metal-coated diamond grit for use in a resin bonded grinding element having diamond particles embedded in the grinding surface thereof wherein the metal-coated diamond grit is useful in both wet grinding and dry grinding operations. The improvement in processes for dry grinding and wet grinding a workpiece comprising either cemented metal carbide (eg. cobalt cemented tungsten carbide) or a combination of cemented metal carbide and steel with the resin bonded grinding element comprises using metal-coated diamond particles coated with two layers of metal. The inner layer adjacent the diamond particle consists essentially of between about 40% and 130% by weight of the diamond particle of nickel and the outer layer consists essentially of between about 20% and 70% by weight of the diamond particle of silver. The total weight of both coatings does not exceed about 200% by weight of the diamond particle.

The present invention provides a substantial improvement in operations which require both dry grinding and wet grinding. The main advantage is that the grinding performance of the novel dual-coated diamond particles is about equal to that of commercial nickel coated diamond in wet grinding and superior in dry grinding. A further advantage is that such improved grinding performance is accomplished with only a moderate increase in grinding energy. These advantages will be readily apparent to those skilled in the art based upon the disclosure herein.

DETAILED DESCRIPTION OF THE INVENTION

The properties possessed by the grinding element containing the dual coated diamond particles are unique and unexpected. The ability of the dual coated diamond particles to provide increased or at least equivalent grinding ratios under both dry and wet grinding conditions is unique to the metals of choice and to the coating sequence employed for such metals. This uniqueness is underscored when comparing the results achieved by the dual coated diamond particles of the present invention to prior metal coated diamond particles. That is, commonly assigned application Ser. No. 264,765, filed on May 18, 1981, now abandoned, teaches that diamond particles having their exterior surfaces coated with a layer of only silver provides improved grinding ratios when dry grinding tungsten carbide and tungsten carbide/steel substrates while providing unexpectedly lower grinding energies; however, grinding ratios substantially decreased under wet grinding conditions. Thus, it is quite unexpected that the use of silver as part of the dual coating system of the present invention functions effectively under wet grinding conditions to provide acceptable performance in both dry and wet grinding of tungsten carbide and tungsten carbide/steel substrates. Moreover, such improved grinding performance is achieved at specific coating levels of each metal employed as will be disclosed in greater detail below.

The dual coated diamond grit of the present invention comprises individual diamond particles, each of said particles being coated with two layers of metal, the inner layer adjacent the diamond particle surface being nickel and the outer metal layer being silver. As the Examples will demonstrate, dry grinding of tungsten carbide substrates is improved by use of silver overcoating a nickel clad diamond particle. For tungsten carbide/steel substrates under dry grinding conditions, at low levels of nickel, the silver overcoat provides only a modest increase in performance and such modest increase is maintained up to coating levels of nickel of about 130% by weight of the diamond particle. Under wet grinding conditions, low levels of nickel with varying amounts of silver overcoat decrease grinding performance on both tungsten carbide and tungsten carbide/steel substrates. At higher levels of nickel; however, varying proportions of the silver overcoat produce good grinding performance on tungsten carbide substrates and much improved grinding performance on tungsten carbide/steel substrates. The fact that silver does not substantially diminish grinding performance under wet grinding conditions is unique and contrary to prior art concerning silver coated diamond grit.

Thus, it can be seen that the dual coating of the present invention permits a dual coated diamond grit which is universal for both wet grinding and dry grinding of tungsten carbide and tungsten carbide/steel substrates. This means that machine shops need only stock a single grinding element which is useful for both wet and dry grinding of tungsten carbide substrates, rather than maintaining two different stocks of grinding wheels, one for wet grinding and one for dry grinding. Depending upon the grinding conditions employed and the particular substate being ground, the inner layer of nickel should range in proportion by weight of the diamond particle of between about 40% and 130%. The outer layer of silver which overcoats the inner nickel layer should be in a proportion by weight of the diamond particle of between about 20% and 70%. The total weight of both coatings by weight percent of the uncoated diamond crystals should not exceed about 200% by weight of the diamond particle in order to minimize the chance of the wheel burning up under dry grinding of tungsten carbide/steel substrates. Within the ranges noted above, the silver overcoat will not detract from the good wet grinding performance expected and experienced by conventional nickel coated diamond grit and can provide much improved dry grinding performance as the Examples will demonstrate.

A wide variety of conventional manufacturing techniques can be used to achieve the coatings on the diamond grit. Such methods include, for example, coating the diamond grains with a solution of ammoniacal nickel sulfate and reducing such solution with hydrogen, chemically reducing a nickel salt from aqueous solution onto the diamond grains, electrolytic deposition of nickel onto the diamond grains, and a wide variety of similar techniques.

The most common method of metal coating electrically non-conducting abrasives is by the electroless plating or chemical reduction process. In a typical process the surface of the abrasive is "activated", i.e. by deposition of spots of palladium on the surface through the decomposition of a palladium salt (e.g. palladium chloride). Prior to this activation step, the crystal surface may be sensitized by agitating the crystals in a heated bath of stannous chloride. U.S. Pat. No. 3,556,839 teaches a continuous process for coating diamonds with nickel by the electroless process. A batch process for accomplishing the same thing is explained in Example 3 of U.S. Pat. No. 3,904,391.

A good general discussion of electroless plating is found in Lowenheim, F. A., Electroplating, McGraw-Hill Book Co., 1978, Chapter 17. Through Lowenheim and through two previously mentioned U.S. Pat. Nos. (3,556,839 and 3,904,391 which are incorporated by reference herein) several different nickel plating bath compositions are taught along with the appropriate conditions. The bath temperatures seem to range between 57° and 95° C., and pH ranges from 4 to 11. If a batch type process is used, treatment of the crystals in one plating bath batch may be insufficient, after depletion of the metal content, to obtain the desired coating thickness. Therefore, a series of sequential batch steps called stations (as many as 10 to 30) may be necessary. In normal practice, each coating or plating bath station is depleted to about 80 to 85 percent of its metal content (taking about 20 minutes) at which time the bath is emptied of liquid and a fresh coating bath started. However, the activation step (e.g. addition of palladium chloride) need only be performed in the initial bath. Hydrogen gas is evolved during the process, and therefore, adequate exhaust ventilation is required. Sufficient agitation is required during the coating to prevent crystal agglomeration.

The nickel-coated diamond grit then is overcoated with a layer of metal consisting essentially of elemental silver. While a variety of techniques for individually coating the nickel-coated diamond grit may be possible, the preferred method for coating the nickel coated grit with elemental silver is that method disclosed in commonly assigned application of John W. Grenier, U.S. Ser. No. 264,733, field May 18, 1981, now U.S. Pat. No. 4,403,001, the disclosure of which is expressly incorporated herein by reference. The Grenier process for coating diamond grit utilizes a formulation known in the art as the Brashear Formula. The Brashear Formula involves an ammoniacal silver solution and a reducing solution. The ammoniacal silver solution preferably is formed from silver nitrate and potassium hydroxide dissolved in water to which ammonia is added. The reducing solution preferably is aqueous invert sugar. The essence of the Grenier process for coating diamond grit with a coating consisting essentially of elemental silver involves suspending the diamond grit in the ammoniacal silver solution, preferably by physical agitation thereof, followed by the slow addition of the reducing solution thereto while maintaining the agitation and diamond suspension in the silver solution. The metered rate of addition of the reducing solution is carried on until the silver has been coated onto the individual diamond grit and such process repeated until the desired coating weight (or thickness) has been attained. Advantages of the Grenier process include a substantially uniform continuous grainy coating of silver on the diamond grit of closely controlled weight percent. As noted above, the proportion of the outer silver layer should range from between about 20% and 70% by weight of the diamond particle. The total weight of both coatings (nickel coating and silver coating) should not exceed about 200% by weight of the diamond particle.

The particle size of the diamond grit is not a limitation of the Grenier process nor is the particle size a limitation on the present invention as those diamond grit particles sizes conventionally used in resin bond grinding elements are used according to the precepts of the present invention. Generally, the diamond grit can range in particle size from about 400 mesh (37 microns) upwards to 40 mesh (425 microns). Preferably, though, narrow particles size distributions are used according to conventional grinding technology with particle size distributions of 80/100 mesh (180–150 microns), 140/170 mesh (106–90 microns), and 200/230 mesh (75–63 microns) being typical preferred particle size distributions of the diamond grit for use in the present invention.

The resin most frequently used in resin bonded grinding elements or other abrasive elements is a phenol-formaldehyde reaction product. However, other resins or organic polymers may be used such as melamine or urea formaldehyde resins, epoxy resins, polyesters, polyamides, and polyimides. A resinoid grinding wheel with the dual-coated diamond grit of the present invention can be formed, for example, in the manner as taught in U.S. Pat. No. 3,645,706 (which is incorporated herein by reference). Further details on resins can be found in U.S. Pat. Nos. 3,385,684; 3,664,819; 3,779,727; and 3,957,461 (all of which are incorporated herein by reference). The concentration of dual-coated diamond grit in the resin bonded grinding element broadly ranges from about 25 to 200 (100 concentration conventionally being defined in the art as 4.4 carats/cm$^3$ with 1 carat equal to 0.2 g wherein the concentration of diamond grains is linearly related to its carat per unit volume concentration). Preferably, the concentration of dual-coated diamond grit ranges from about 50–100. The size and shape of the grinding element is conventional, and typically grinding wheels are of a disc shape or cup shape. Of course, a secondary distribution of silicon carbide or other secondary abrasive particles may be used in the resin bond grinding elements without detrimentally affecting the performance of the grinding element containing the dual-coated diamond grit of the present invention. In a typical preparation of a resin bond grinding wheel, a mixture of granulated resin, diamond abrasive particles, and filler is placed in a mold. A pressure appropriate to the particular resin, usually several thousand pounds per square inch (several tens of thousands of Kilo pascals), is applied, and the mold is heated to a temperature sufficient to make the resin plastically deform (and cure when the resin is heat-curable).

The improved resinoid grinding elements of the present invention having the dual coated diamond grit in the grinding area thereof are extremely useful in both dry and wet grinding of non-ferrous workpieces such as cemented tungsten carbide and cemented tungsten carbide/steel combinations. Cemented tungsten carbide and similar non-ferrous workpieces are well known in the art and little more need be said about them here.

The following Examples show how the present invention can be practiced, but should not be construed as limiting. In this application, all units are in the metric system, all mesh sizes are in United States Standard Sieves Series, and all percentages are by weight, unless otherwise expressly indicated. Also, all references cited herein are expressly incorporated herein by reference.

IN THE EXAMPLES

In the Examples, the diamond grit was coated with nickel by chemically reducing an aqueous nickel salt.

The silver coating then was applied by coating the nickel-coated diamond grit of indicated particle size with a coating consisting essentially of silver according to the Grenier process. The recovered dual-coated diamond grit then was used in forming resinoid grinding elements as indicated in the Examples which follow.

EXAMPLE 1

In order to demonstrate the effectiveness using the dual silver over nickel coated diamond grit in resin bond grinding wheels for dry grinding cemented tungsten carbide and cemented tungsten carbide/steel workpieces, a series of phenolic resin bonded grinding wheels were prepared containing 25 volume percent (100 concentration) of various types of resin bond diamond grit (all 140/170 mesh). The grinding wheels were standard D11V9 flaring cup grinding wheels, 9.525 cm (3.75") diameter, with a 0.3175 cm (0.125") wide abrasive rim. The diamond grit was either coated with nickel or coated at various levels with silver and nickel. The workpieces ground were 6.4 mm × 19.1 mm bars of CARBOLOY Grade 370 cemented tungsten carbide or 9.6 mm × 19.5 mm bars of CARBOLOY Grade 44A tunsten carbide/Grade 01 steel (50% by weight each). (CARBOLOY is a registered trademark of General Electric Company). The two sets of dry grinding conditions used are given below:

|  | Condition #1 | Condition #2 |
| --- | --- | --- |
| Wheel speed | 18 m/sec. | 18 m/sec. |
| Table speed | 1.5 m/min. | 1.5 m/min. |
| Infeed | 0.050 mm | 0.038 mm |
| Coolant | dry | dry |
| Workpiece Type | Grade 370 WC | Grade |

-continued

|  | Condition #1 | Condition #2 |
| --- | --- | --- |
|  |  | 44A WC/O1 steel |

The weight-percent of the coating, the size of the diamond grit, and the results obtained (grinding ratio and grinding energy) are displayed in the following table.

TABLE 1

| Sample | Test[1] Condition | Coating weight % (based on diamond wt.) Silver | Coating weight % (based on diamond wt.) Nickel | Coating Level as wt. % of based on assay) | GR[3] | Energy[4] |
| --- | --- | --- | --- | --- | --- | --- |
| A[5] | 1 | 0 | 43 | 30 | 34.2 | 45 |
| B | 1 | 24 | 43 | 40 | 55.1 | 52 |
| C | 1 | 57 | 43 | 50 | 94.9 | 63 |
| D | 1 | 0 | 127 | 56 | 37.9 | 51 |
| E | 1 | 67 | 127 | 66 | 170.0 | 73 |
| F[2] | 1 | Commercial copper coated diamond | | 50 | 98.0 | 69 |
| G[5] | 2 | 0 | 43 | 30 | 8.9 | 51 |
| H | 2 | 24 | 43 | 40 | 9.3 | 63 |
| I | 2 | 57 | 43 | 50 | 10.2 | 69 |
| J | 2 | 0 | 127 | 56 | 10.7 | 61 |
| K | 2 | 67 | 127 | 66 | too much power and work piece burn | |

[1] All condition 1 results are the average of two wheels except the 67 Ag/127 Ni tests which are the average of three wheels. All condition 2 test results are for one wheel.
[2] Obtained as 140/170 mesh RVG-D Man-Made ™ Diamond from General Electric Company.
[3] GR is grinding ratio (ratio of the volume of workpiece material removed to the volume of grinding wheel material removed during the grinding operation).
[4] Grinding energy (watt-hour/cm$^3$ of workpiece removed).
[5] Obtained as RVG-W Man-Made ™ Diamond from General Electric Company.

The above-tabulated results show that the Ag/Ni coating for dry grinding cemented WC substrates results in substantial improvement in grinding performance with increasing levels of silver. For example, at 43% Ni, from 0% to 57% silver, the grinding ratio increased 177%, but the grinding energy increased only 40%. At 127% Ni, from 0% to 67% Ag, the grinding ratio increased 349% but the grinding energy increased only 43%. On cemented WC/steel substrates, a small improvement in grinding performance also resulted from the dual coating up to a total coating level of 66% by weight of the total coated diamond particle at which point too much power is required and workpiece burn can occur.

These results establish that the total coating level should be restricted to not exceed about 66% by weight of the coated diamond (coating plus diamond grit).

EXAMPLE 2

Additional phenolic resin bonded straight grinding wheels (12.7 cm diameter×0.48 cm width×3.175 cm bore) were prepared containing nickel coated diamond grit and other wheels containing dual silver/nickel coated diamond grit (80/100 mesh). The diamond concentration in all wheels was 25 volume percent (100 concentration). The wheels were used to wet surface grind CARBOLOY Grade 370 tungsten carbide workpieces (145 cm$^2$ surface area) and Carboloy grade 55B tungsten carbide/AISI grade 4140 steel lamination die workpieces (245 cm$^2$ surface area) under the following grinding conditions.

|  | Condition #1 | Condition #2 |
| --- | --- | --- |
| Wheel speed | 24.5 m/sec. | 24.5 m/sec. |
| Table speed | 15 m/min. | 15 m/min. |
| Downfeed | 0.038 mm. | 0.0254 mm. |
| Crossfeed | 1.27 mm. | 1.27 mm. |
| Coolant | H$_2$O + water-soluble oil | H$_2$O + water soluble oil |
| Workpiece Type | Grade 370 WC | lamination dies |

The following grinding results were obtained:

TABLE 2

| Test[1] Condition | Coating weight % (based on diamond wt. %) Silver | Coating weight % (based on diamond wt. %) Nickel | Coating Level as wt % of total particle (based on assay) | GR | Energy |
| --- | --- | --- | --- | --- | --- |
| 1 | 0 | 43 | 30 | 89.4 | 18.2 |
| 1 | 24 | 43 | 40 | 72.9 | 16.8 |
| 1 | 57 | 43 | 50 | 77.2 | 17.4 |
| 1 | 0 | 127 | 56 | 106.0 | 23.0 |
| 1 | 67 | 127 | 66 | 104.8 | 22.3 |
| 2 | 0 | 43 | 30 | 24.4 | 7.4 |
| 2 | 24 | 43 | 40 | 18.0 | 8.4 |
| 2 | 57 | 43 | 50 | 12.7 | 8.5 |
| 2 | 0 | 127 | 56 | 185.9 | 14.5 |
| 2 | 67 | 127 | 66 | 252.0 | 17.4 |

[1] All condition 1 test results are the average of two wheels and all condition 2 test results are for one wheel.

The above-tabulated results demonstrate that the inventive dual coating does not substantially deleteriously affect the wet grinding performance on cemented tungsten carbide. On similar tungsten carbide/steel lamination dies, however, the grinding performance is substantially enhanced at high levels of nickel. The universality of the inventive dual coating is thus established.

Based on the above-tabulated results, the preferred resin bond diamond has a nickel coating of about 50 to 130 and more preferably 127 weight-percent and a silver overcoat of about 50 to 70 and more preferably 67 weight-percent (all percentages based on the weight of diamond being 100%).

We claim:

1. In a method for grinding a workpiece selected from the group consisting of cemented tungsten carbide and combinations of cemented tungsten carbide and steel with a resin bonded grinding element having metal-coated diamond particles embedded in the grinding surface thereof, the improvement for providing coated diamond particles useful for both dry grinding and wet grinding operations which comprises using diamond particles coated with two layers of metal, the inner layer comprising nickel which comprises between about 40% and 130% by weight of said diamond particles, the outer layer comprising silver which comprises between about 20% and 70% by weight of said diamond particles, the total weight of said coatings not exceeding above about 200% by weight of said diamond particles.

2. The method of claim 1 wherein the proportion of silver is between about 50% and 70% by weight of said diamond particle, and the proportion of nickel is between about 50% and 130% by weight of said diamond particle.

3. The method of claim 2 wherein the proportion of silver is about 67% by weight of said diamond particle and the proportion of nickel is about 127% by weight of said diamond.

4. The method of claim 1 wherein said diamond particles range in size from between about 37 microns and 425 microns.

5. The method of claim 1 wherein the concentration of said metal-coated diamond particles in said grinding element is between about 1 and 9 carats/cm$^3$.

6. The method of claim 5 wherein said concentration is between about 2.2 and 4.4 carats/cm$^3$.

7. The method of claim 1 wherein said cemented metal carbide is cemented tungsten carbide.

8. An improved resin bond grinding element comprising diamond grit embedded in a resinous material, wherein the improvement comprises diamond grit coated with two layers of metal, the inner layer comprising nickel which comprises between about 40 and 130 percent by weight of the diamond, the outer layer comprising silver which comprises between about 20 and 70 percent by weight of the diamond, and the total weight of said inner and outer layers not exceeding about 200 percent by weight of the diamond.

9. An improved coated diamond abrasive, wherein the improvement comprises diamond abrasive particles which are coated with two layers of metal, the inner layer comprising nickel which comprises between about 40 and 130 percent by weight of said diamond particles, the outer layer comprising silver which comprises between about 20 and 70 percent by weight of said diamond particles, the total weight of said coating layers not exceeding about 200 percent by weight of the diamond particles.

10. The improved coated diamond abrasive of claim 9 wherein the diamond particles range in size from about 37 to about 425 microns, the proportion of nickel is between about 50 and 130 percent by weight of the diamond particles, and the proportion of silver is between about 50 and 70 percent by weight of the diamond particles.

11. In a method for grinding a workpiece comprising a combination of cemented tungsten carbide and steel with a resin bonded grinding element having metal-coated diamond particles embedded in the grinding surface thereof, the improvement of providing coated diamond particles useful for both dry grinding and wet grinding operations which comprises using diamond particles coated with two layers of metal, the inner layer comprising nickel which comprises between about 40% and 130% by weight of said diamond particles, the outer layer comprising silver which comprises between about 20% and 70% by weight of said diamond particles, the total weight of said coatings not exceeding above about 200% by weight of said diamond particles.

12. The method of claim 11 wherein the proportion of silver is between about 50% and 70% by weight of said diamond particle, and the proportion of nickel is between about 50% and 130% by weight of said diamond particle.

13. The method of claim 12 wherein the proportion of silver is about 67% by weight of said diamond particle and the proportion of nickel is about 127% by weight of said diamond.

14. The method of claim 11 wherein said diamond particles range in size from between about 37 microns and 425 microns.

15. The method of claim 11 wherein the concentration of said metal-coated diamond particles in said grinding element is between about 1 and 9 carats/cm$^3$.

16. The method of claim 15 wherein said concentration is between about 2.2 and 4.4 carats/cm$^3$.

17. The method of claim 11 wherein said cemented metal carbide is cemented tungsten carbide.

* * * * *